United States Patent [19]

Lockhardt

[11] Patent Number: 5,186,527
[45] Date of Patent: Feb. 16, 1993

[54] DEVICE PROVIDING EASY EXTRACTION OF VIDEO CASSETTES AND THE LIKE FROM CLOSELY FITTING STORAGE JACKETS THEREFOR

[76] Inventor: Michael A. Lockhardt, R.F.D. #4, Box 48, Dover, N.H. 03820

[21] Appl. No.: 866,483

[22] Filed: Apr. 10, 1992

Related U.S. Application Data

[63] Continuation-in-part of Ser. No. 582,153, Sep. 14, 1990, Pat. No. 5,104,207.

[51] Int. Cl.$^5$ ............................................. A47B 88/00
[52] U.S. Cl. .................................. 312/9.47; 312/319.1
[58] Field of Search ................. 312/12, 319; 206/387; 211/40, 41

[56] References Cited

U.S. PATENT DOCUMENTS

5,104,207 4/1992 Lockhardt ........................ 206/387

*Primary Examiner*—Joseph Falk
*Attorney, Agent, or Firm*—Herbert L. Gatewood

[57] ABSTRACT

Device providing easy extraction of video cassettes and the like from closely fitting storage or protective jackets therefor provided for use in combination with such a closely fitting protective jacket for a video cassette for aid in easy removal of the video cassette from the protective jacket. A video cassette can be removed from its protective jacket without removal of that jacket from a storage device in which a plurality of video cassettes are stored in such a manner that the protective jackets are in side-by-side contact.

8 Claims, 3 Drawing Sheets

DEVICE PROVIDING EASY EXTRACTION OF VIDEO CASSETTES AND THE LIKE FROM CLOSELY FITTING STORAGE JACKETS THEREFOR

RELATIONSHIP TO OTHER APPLICATIONS

This patent application is a continuation-in-part of application Ser. No. 582,153 entitled "Means Providing Easy Extraction of Video Cassettes And The Like From Storage Jackets Therefor," filed Sep. 14, 1990 now U.S. Pat. No. 5,104,207 issued Apr. 14, 1992.

BACKGROUND OF THE INVENTION

(1) Field of the Invention

This invention relates, in general, to a device useful in facilitating the extraction or removal of a video cassette or the like from a closely fitting storage or protective jacket in which the video cassette is stored while not being used. The invention, in a further aspect, relates to an improved protective storage jacket for a video cassette or the like-shaped member provided with a device enabling easy extraction of the video cassette from the protective jacket.

(2) Description of the Prior Art

It is commonly known that dirt, dust and the like acts to damage blank tapes and to destroy the visual or sound qualities, or both, of the material recorded on the cassette tapes. Such destructive agents, in general, gain access to the tape, audio or video, through the tape access openings in the cassette.

As a result of such destructive agents being common to the environment during the marketing channels for such tapes and in the home after purchase, video tapes are generally sold in a protective jacket providing complete enclosure of the tape except for the front or end opening in the jacket whereby the tape can be removed or extracted from the protective jacket. The blank tapes are, in general, kept by the consumer in these protective jackets until desired to be used for seeing or recording a movie. At such time, if the video tape is new, the plastic film or other wrapper is removed from around the jacket and the blank tape removed therefrom. Subsequent to the recording of the desired movie, for example, the video cassette is then generally placed by the consumer back into the protective jacket. The jacketed movie is then placed, in some cases at least, in a storage device capable of holding several such jacketed cassettes. The video tape remains in the jacket until there is a desire to again view the movie at a later time or to record another movie over it. Pre-recorded movies are, in general, protected in the same manner, i.e., they are sold in protective jackets and enclosed in a film wrapper. The protective jacket in which a video tape cassette is sold provides not only protection against dust, etc., it also serves to protect the tape cassette and tape from being damaged while in the channels of trade. And, it serves a similar purpose after purchase by the consumer.

The protective jacket for a video cassette is constructed, in general, from plastic, or heavy paper coated so as to be printable thereon with various illustrations, designs, text, etc. These jackets, as is common, are mostly of an elongated, rectangular, cubic-shape defining an internal storage cavity and are open at one elongated end, i.e. the front end, so that the tape cassette can be extracted from and placed back into the internal storage compartment, as desired. In some cases, however, either the top or bottom end is the only opening. Thus, in such a case, the video cassette is extracted from the bottom or top end, whichever is the open end, rather than from the front. In any event, the dimensions of the storage cavity are closely that of the tape cassette making removal from the cassette difficult. The back planar surface of the cassette, i.e., the surface opposite from that of the tape access opening in the front of the jacket, to which an identifying label is typically attached, is essentially in the same plane as that defined by the open front of the protective jacket.

Because of the protective jacket's construction and dimensions, relative to those of the video cassette, somewhat of a problem is presented in extracting or removing a cassette from its protective jacket, as it is difficult to grasp the back edge of the cassette with one's fingers in order to extract it from the jacket. As a result of this difficulty, the two elongated edges of the storage jacket at the front open end are, in some cases at least, provided with opposed indentations or cut-outs along their length, to enable one to grasp the back edge of the cassette with one's fingers, aiding withdrawal of the tape cassette from the jacket.

Although the cut-outs provided in a storage jacket enable one to withdraw a particular video cassette from its protective jacket with relative ease, the cut-outs provide no help at all where a predetermined number of such video cassettes are stored in vertical disposition, for example, in their jackets, side-by-side, in a storage device therefor. The next adjacent jackets, in such a case, are in substantial contact with one another, making it most difficult, if not impossible, for one to grasp any particular cassette or jacket with one's fingers so as to be able to remove such a cassette, or the protective jacket containing it, from between the next adjacent protective jackets.

As a result of these difficulties presented in removal of a video cassette from its conventional storage jacket in which purchased, as above-pointed out, others heretofore have addressed this problem. For example, U.S. Pat. No. 4,339,162 discloses an elongated rectangular-shaped storage box for use in storing video cassettes in upright manner. The storage device or box provided offers, according to the patentee, quick and easy removal of a video cassette from the storage device. The box is of one piece construction with an open front for accessing the storage compartment which is disclosed to be only slightly larger than the normal size video cassette. The storage box is provided with a slidable tray having a tab at the front end which extends outwardly from the front opening of the storage box, and which has a handle portion for easy grasp by the user of the storage device. The slidable tray is provided at the other end with an upwardly extending tongue which engages with the rearmost corner of a cassette. Thus, when the cassette is loaded into the storage device it is located on the slidable tray and that tray slides backwardly into, and to the rear of, the storage box, as the cassette is pushed into the storage compartment. When it is desired to remove the cassette, the tab is gripped by one's fingers and pulled in a direction directly outwardly from the storage box whereby the slidable tray with the cassette located thereon is moved outwardly, clearing the edges of the storage box, at the open front. The cassette can then be readily grasped by one's fingers and removed from the storage box.

Although the construction of the video tape storage device disclosed in the above-mentioned patent may be found to facilitate the removal of a tape cassette from its storage compartment, the use of such is believed attendant with certain disadvantages. The construction of such a storage device for video cassettes, as will be readily appreciated, is relatively complex, compared to that of the rather simply constructed protective jacket which video tape cassettes, whether blank or containing prerecorded movies or the like, are typically sold. Accordingly, it is believed obvious that the cost of such storage devices for video casettes will be substantially greater than that of the conventional rectangular-shaped, open front, protective storage jacket.

Thus, there was a need for a means for storing video cassettes and the like which not only provides good protection to an individual tape against dust, dirt and other damage but also allows simplicity in construction and easy extraction of the video cassette from its storage device, and at reasonable cost. As a result of this, I conceived the invention, and its various aspects, disclosed in application Ser. No. 582,153, earlier mentioned, for easy removal of a video cassette from the protective jacket in which it is originally purchased. Thus, continued use of this protective jacket is made more feasible and results in certain economies to the consumer. Now, I have invented another somewhat more simply constructed device for use in easily removing video cassettes from their closely fitting storage jacket in which the video cassette was purchased.

SUMMARY OF THE INVENTION

A primary object of the invention disclosed herein is to provide a means or device facilitating the extraction or removal of a video tape cassette or other member from a closely fitting, protective storage jacket therefor.

Another object is to provide a device for facilitating the extraction of a video cassette or other member from a storage jacket which is of simple construction.

A further object of the invention is to provide a protective storage jacket for video cassettes which is of simple and economical construction and which offers facility in removal of a video cassette from its internal storage compartment.

A still further object is to provide an improved storage jacket for video tape cassettes which closely fits the cassette and allows compact storage of a number of the video cassettes in a storage device for a plurality of video cassettes each in its protective jacket.

Still another object of the present invention is to provide a video cassette extraction or removal device which can be readily combined by the video enthusiast with an existing, conventional rectangular-shaped open front or end storage jacket for a video cassette whereby such a video cassette can then be more readily and easily removed from the jacket.

A still further object of the invention is to provide an improved protective storage jacket for a video cassette which allows the video cassette to be easily and readily removed therefrom and a library thereof to be stored in a more compact space.

A still further object is to provide an improved protective storage jacket for a video cassette whereby removal of the video cassette from the storage jacket is facilitated when a plurality of such video cassettes are stored in a storage device therefor and the storage jackets are so disposed in vertical fashion that their side walls are in abutting relationship one to another making difficult the grasping of the video cassette with one's fingers.

Thus, there is provided in accordance with the broader aspects of the invention a device providing greater ease in extracting an object from a close fitting protective jacket therefor having an open front, for example, a conventional storage jacket for a video cassette, said extraction device comprising an elongated planar member of predetermined length defined by inner and outer ends and parallel, spaced-apart side edges and by top and bottom planar surfaces, said elongated planar member being further defined by an inner portion and an outer portion connected thereto, at least one elongated second planar member of predetermined length defined by top and bottom planar surfaces being provided in said inner portion of the extraction device defined by parallel, elongated, spaced-apart, side edges parallel to the side edges of the first-named, elongated planar member and being located therebetween, said at least one second planar member being further defined by an inner and outer end edge of predetermined length spaced-apart from and parallel to one another, said inner and outer end edges being laterally disposed and perpendicular to the elongated side edges of the first-named planar member, the outer end edge and side edges of the at least one second planar member being free of the first-named planar member and the inner end edge thereof being fixedly attached thereto whereby when the bottom planar surface of the said at least one second planar member is secured adjacent its outer end to a fixed member and a force is applied to the first-named planar member at its outer end, the said at least on second-named planar member can be separated from the first-named planar member defining an opening in the first-named planar member of like shape and dimensions as the second-named planar member, the inner portion at least of the first-named planar member being sufficiently flexible so that when the force applied to the outer end of the first-named planar member is released, the first named planar member will be caused to close on the second-named planar member and said second-named planar member will tend to be relocated in the opening in said inner portion.

BRIEF DESCRIPTION OF THE DRAWINGS

For a better understanding of the invention, reference should be had to the following detailed description of the preferred embodiments of the invention which is to be read in conjunction with the accompanying drawings, in which.

DETAILED DESCRIPTION OF THE DRAWINGS AND THE PREFERRED EMBODIMENTS OF THE INVENTION

Figure 1:
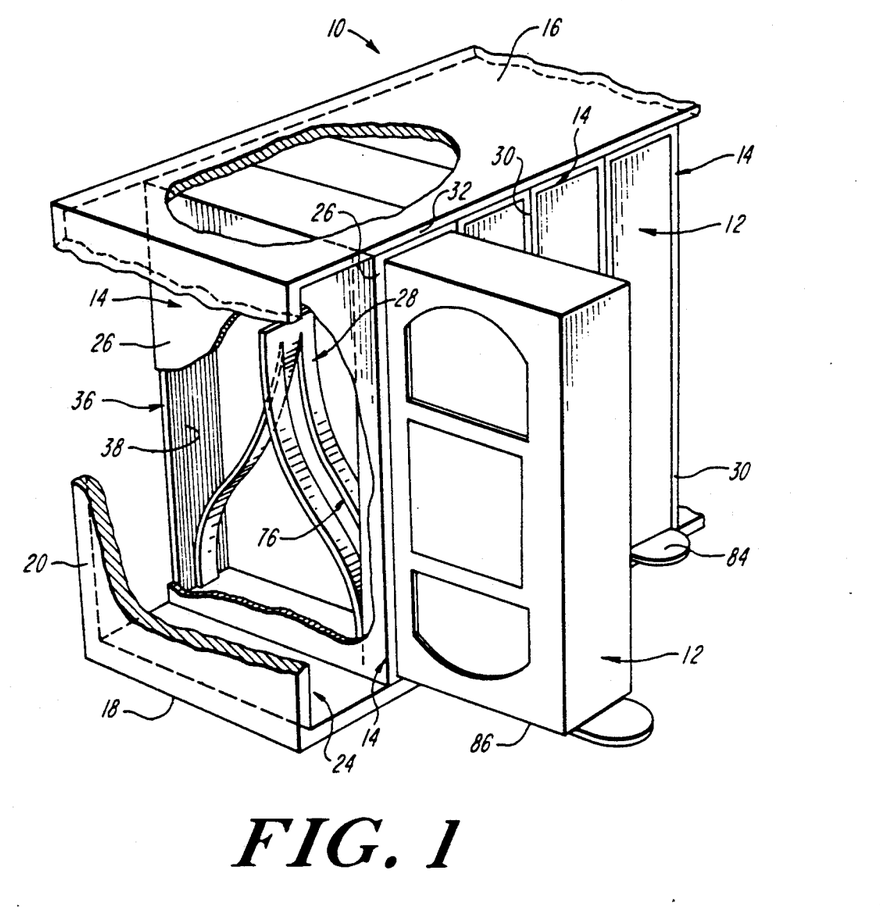
FIG. 1 is a view in perspective showing a portion of a device for storing a plurality of video tape cassettes each in the protective storage jacket in which it was purchased, stored side-by-side in vertical disposition in the storage device, and showing a cut-away view of the storage device and a storage jacket at the left end disclosing an extraction device according to the invention in operative combination with the protective jacket.

Turning now to the drawing, there is shown in FIG. 1 thereof a rectangular-shaped, box-like storage device 10 in which is located a library, i.e., a plurality of video cassette tapes 12, each in a protective storage jacket 14. The storage device 10 is of cubic shape defined by spaced-apart upper and lower planar surfaced members or panels 16, 18, parallel to one another, and planar, parallel side members or panels 20, 22 (not shown) which are spaced apart from one another and which intersect and connect with the upper and lower surfaces to define a rectangular-shaped internal storage compartment or cavity 24. Storage device 10, in the device shown in FIG. 1, is open at the front and rear whereby a video cassette tape storage device of the most simple construction is provided, according to one feature of the invention. Nevertheless, if desired, the storage device 10 can be readily provided with a back wall or closure, leaving only the front open.

Storage device 10 is of relatively rigid construction whereby it will retain its rectangular shape even with no video cassettes 12 stored therein. The storage device 10 can be set on any planar surface such as the top of a TV-cabinet or a table. Nevertheless, the storage device 10, as shown, may be more desirably located on a vertically disposed wall or other such surface. In that case, the wall will, in effect, provide a back surface or closure for the open back of the device 10 shown in the drawings. The storage device 10 can be mounted to the wall by various conventional fastening means well known to those skilled in the art.

The thickness of the upper and lower members 16, 18, and side members 20, 22, will be determined somewhat by the size of the storage device 10, i.e., how many video cassettes 12 are to be stored therein. These members should, however, be relatively inflexible. The back member, if one is provided, need not be as thick as the other members as such is not intended to be a load bearing member. Nevertheless, it may help to provide some rigidity to the storage device.

As shown in FIG. 1, the internal storage cavity 24 of storage device 10 is of sufficient size and dimensions to store a number of video cassette tapes 12 therein the left end one having been removed for purposes of greater clarity in the disclosure of the invention, along with a portion of the end wall 20 of the storage device 10, and a portion of the left side wall 26 of the protective jacket 14. As will be appreciated from FIG. 1, the video cassettes 12 are each housed within a storage jacket 14 in which such cassettes were originally purchased. It will be appreciated, however, that storage device 10 can be of such dimensions as to house a smaller or larger number of video cassettes as desired.

The next adjacent protective jackets 14, as shown in FIG. 1, are so close together that the opposed planar side wall surfaces of each such jackets, as later more fully disclosed, are in contact with one another. While such a feature allows a library of cassette tapes 12 to occupy the minimum amount of storage space, it does present certain problems addressed by this invention and that in my earlier patent application above-mentioned. The internal storage cavity 24 is so dimensioned that its volume is only slightly greater than the combined volume of the video cassettes 12 and their protective jackets 14, shown in the drawing.

The protective jackets 14 (and enclosed cassettes) are located in storage device 10 in vertical disposition, as shown in FIG. 1 of the drawing. The width dimensions of the storage device 10 are only such as to accommodate a predetermined desired number of video cassettes 12 in their protective jackets. Thus, storage device 10 can be of relatively simple construction and need not, with use of the invention, be provided with dividers allowing for individual storage of video cassettes, spaced apart from one another so as to enable one cassette to be more easily withdrawn from next adjacent ones on each side. Although not shown in the drawings, it will be appreciated that storage device 10 can be constructed so that the video cassettes 12 are stored in horizontal manner, if desired, rather than vertically. In such a case, side panel or wall 20, as now shown in FIG. 1, can function, for example, as the lower or base member for supporting the storage device.

The storage device 10 can be constructed of various materials, as desired, for example, wood, pressed wood particles or laminations with decorative surfaces, plastic, metal, or combinations thereof. Various conventionally known plastic compositions can be used in the manufacture of storage device 10, if such is to be made of plastic, e.g., polyvinyl chloride compositions. These can be formulated according to usual techniques to provide any stiffness or flexibility, or other physical characteristics desired. The formulations can be composed of suitable coloring agents to provide the color or colors most aesthetically appealing. Thus, storage device 10 can be manufactured according to various conventional plastic molding techniques, e.g., injection molding. Where of plastic the various members comprising the device 10 can be provided as an integral unit during molding or the various members can be molded individually and then later assembled into a unit, as desired. In that case, the members can be connected together by various means known, e.g. by adhesive or conventional mechanical fastening means.

In the event the storage device 10 is of wood, the upper and lower members and side members can be pre-assembled together or can be sold in kit form for later assembly by the buyer. The components, in such a case, can be glued or otherwise conventionally fastened together e.g. by mechanical fasteners, screws, nails, etc. Where the components comprising storage device 10 are individually manufactured, rather than being molded out of plastic as an integral unit, the upper and lower members 16, 18, for example, may overlap the side panels, allowing for fastening of the various members together. Or the side panels can overlap the top and bottom members, if desired.

As will be readily appreciated from FIG. 1 of the drawing, and earlier comments about the compactness of the plurality of video cassettes 12 and their storage jackets 14, it becomes most difficult, if not impossible, to remove any particular video tape 12 from storage device 10. Nevertheless, with use of an extraction device 28, accordingly to the invention, in combination with the protective jacket 14, as shown, the removal of a video cassette 12 from the protective jacket 14 housing it, is made quite easy. This will be made more clear later on.

Figure 2:
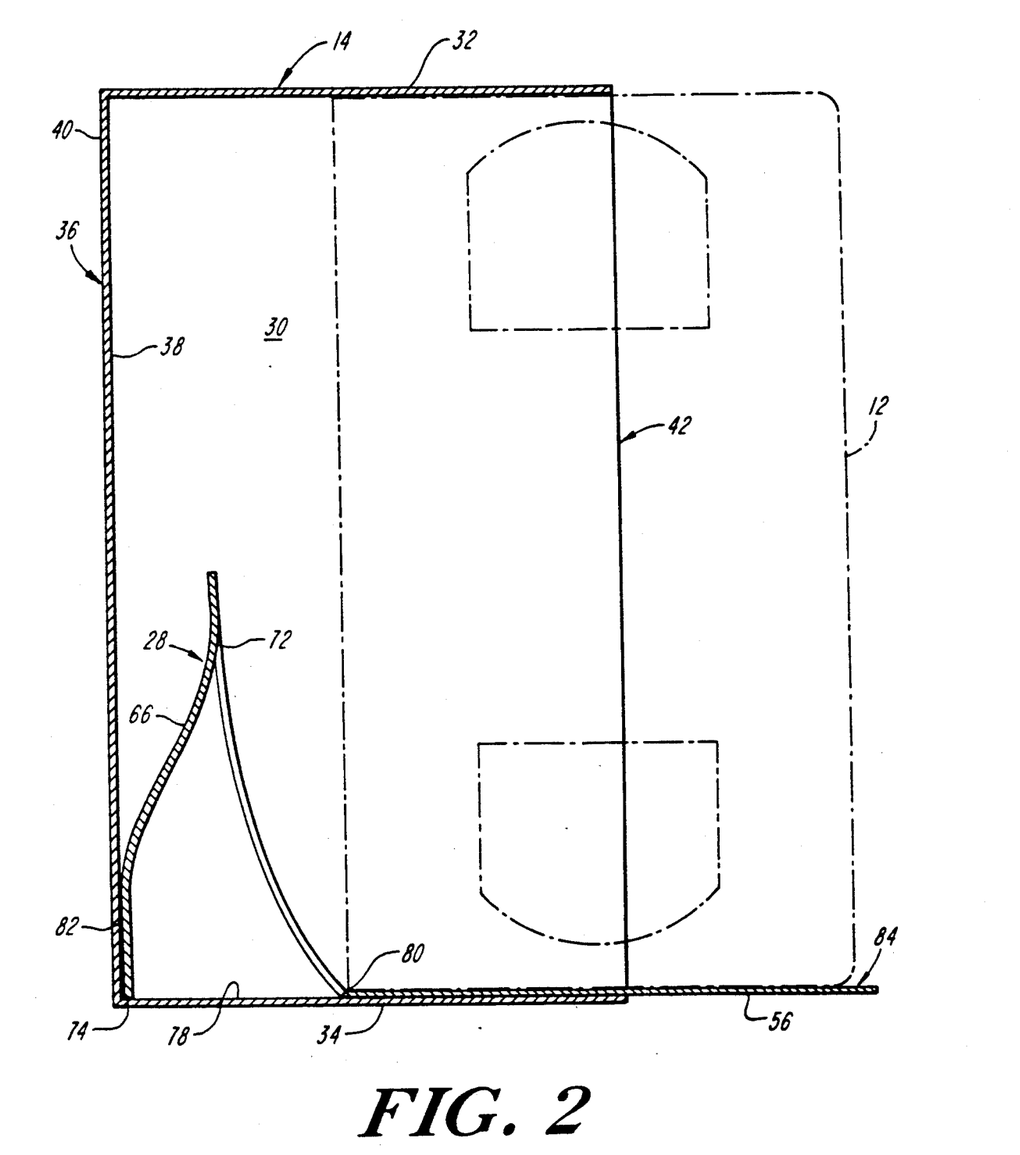
FIG. 2 is a cross-sectional view of a conventional open front protective storage jacket, in which the storage jacket and extraction device are cut in half, used in the sale and storage of video tape cassettes whereby to better show an extraction device of the invention in operative combination with the jacket and a side view of a video tape cassette shown in phantom which has been caused to move toward and partially out of the open front of the jacket by operation of the extraction device.
Figure 3:
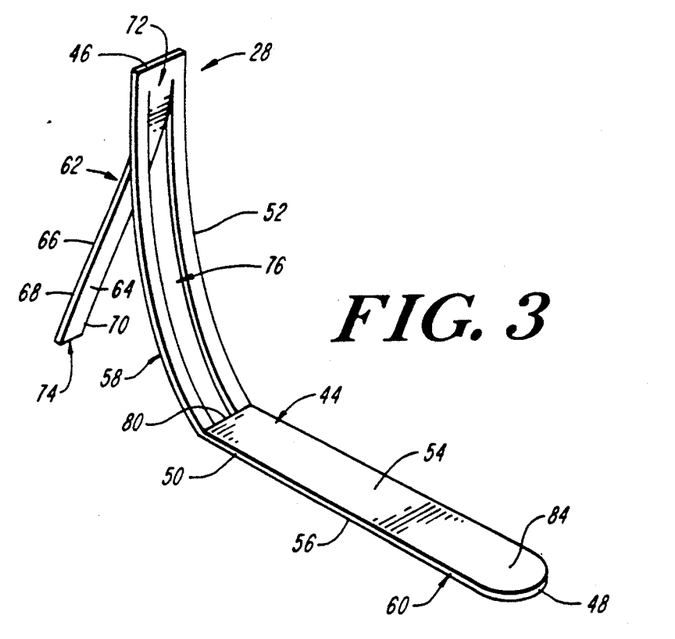
FIG. 3 is a view in perspective of one extraction device according to the invention, the said extraction device being shown in its operative position.

As shown in the drawing, particular attention being paid to FIGS. 2 and 3, an improved protective storage jacket 14 is provided. This results from the fact that jacket 14 has in combination therewith an extraction device 28 according to one aspect of the invention. Storage jacket 14 is of box-like rectangular-shape defined by parallel planar, spaced-apart side walls 26, 30, parallel, planar, spaced-apart top and bottom members 32, 34 and planar, end closure member 36 defined by inner planar surface 38 and outer planar surface 40 parallel thereto. The storage jacket 14, as shown in FIG. 1, is open at the front end defined by the front edges of the side walls 26, 30 and top and bottom members 32, 34, opposite the back wall or closure member 36, as indicated generally by reference numeral 42 (FIG. 2), to allow a video cassette 12 to be placed within, and retrieved or removed from, the internal storage cavity 24 defined by the storage jacket.

The video cassette 12 is of conventional rectangular-shape having an overall thickness substantially less than that of its length and width and, as conventional, occupies substantially the entire storage cavity 24 within the protective jacket. Thus, a somewhat snug fit is provided between the rectangular-shaped storage cavity 24 and the video cassette 12. Nevertheless, the cassette 12 is sufficiently free from the internal surfaces of the storage compartment in the protective jacket so that it can be readily removed from, or replaced therein, in sliding fashion.

The extraction device 28 (FIG. 3), in general, comprises an elongated planar member 44 of predetermined length defined by inner and outer ends 46, 48 and parallel, spaced-apart side edges 50, 52 and by top and bottom planar surfaces 54, 56, said elongated planar member being further defined by an inner portion 58 and an outer portion 60 connected thereto, at least one elongated second planar member 62 of predetermined length defined by top and bottom planar surfaces 64, 66 being provided in said inner portion 58 of the extraction device 28 defined by parallel, elongated, spaced-apart, side edges 68, 70 parallel to the side edges 50, 52 of the first-named, elongated planar member and being located therebetween, said at least one second planar member being further defined by an inner and outer end edge 72, 74 each of the same predetermined length spaced-apart from and parallel to one another, said inner and outer end edges being laterally disposed and perpendicular to the elongated side edges 50, 52 of the first-named planar member, the outer end edge 74 and side edges 68, 70 of the at least one second planar member 62 being free of the first-named planar member and the inner end edge 72 thereof being fixedly attached thereto whereby when the bottom planar surface 66 of the said at least one second planar member is secured adjacent its outer end to a fixed member, i.e., the inner surface 38 of the back wall 36 and a force is applied to the first-named planar member at its outer end 48, the said at least one second-named planar member can be separated from the first-named planar member as shown in the drawings (FIG. 1) defining an opening 76 in the first-named planar member of like shape and dimensions as the second-named planar member 62, the inner portion 58 at least of the first-named planar member being sufficiently flexible so that when the force applied to the outer end of the first-named planar member is released, the first named planar member will be caused to close on the second-named planar member and said second-named planar member 62 will at least tend to be relocated in the opening 76 in said inner portion. In the event the second named planar member does not relocate in opening 76 when the force is released, the second-named planar member 62 will, of course, be caused to locate therein when the video cassette is placed again into its protective jacket.

The outer portion 60 of the planar member 28 need not necessarily be of the same material as the inner portion 62. Neither is there any particular requirement that it be flexible like the inner portion, or for that matter be flexible at all. The main requirement is that such be of a material that it allows the outer portion 60 to readily slide relative to the inside planar surface 78 of the bottom member 34 of the storage jacket. The outer portion 60 can be connected, if desired, to inner portion 58 by various means, e.g., an adhesive tape (not shown) bridging the mating ends of the two portions (FIG. 3). The connecting member need not, however, be provided with an adhesive layer. Various known mechanical fastening means can be used instead, if desired. The main requirement is that such a bridging member be sufficiently flexible as to allow the outer and inner portions to be bent relative to one another, providing a crease 80. Preferably, however, the extraction device 28 will be of one material, as later more fully disclosed. In the event there are two portions connected together by mechanical fastening means, such should not, of course, interfere with the sliding of the outer portion on the inner surface of the bottom end of the jacket.

The extraction device 28 can be installed in a protective jacket 14 to provide an improved protective jacket for video cassettes when sold, as shown by the protective jacket 14 in the drawing, or the extraction means can be separately sold, to be installed by the video enthusiast. In the latter case, the consumer can then retrofit, as desired, any previously acquired protective jackets of the type shown in the drawings, but not containing an extraction means according to the invention.

The extraction device 28, as will be seen by reference to FIG. 2, is installed in protective jacket 14 in such a manner that the top planar surface 66 of the planar member 62, adjacent to the outer end 74, is fixedly connected, e.g., by adhesive layer 82, to the inner planar surface 38 of the end closure 36, at its lower or bottom edge. This can be accomplished by various means, e.g., adhesive or mechanical fastening means, a suitable adhesive being preferred.

In the case of extraction means 28 being individually sold for retrofitting of existing protective jackets, an adhesive layer of the desired length can be applied to the inner surface 66 according to usual techniques during manufacture. This adhesive layer will then have a release layer on (not shown) the exposed adhesive surface as conventionally done. Thus, the consumer can remove the release layer (not shown in the drawing) and apply the bottom of the top surface of the planar member 62 against the inner surface 38 to adhesively secure the two layers together. The length of the adhesive layer, i.e., the distance such extends upwardly on the inner surface 38, can vary somewhat, depending upon the length of the inner portion 58 and the planar member 62 and the flexibility of the inner portion. The length of the bottom planar surface 66 that is free should be such, depending somewhat on the flexibility, as to allow the good operation of the extraction device, yet provide a satisfactory connection to the end closure 36. It will be appreciated that extraction device 28 functions somewhat like a spring. The first and second planar members can be separated from one another by application of force and retract toward one another when the force is released.

Once installed in a jacket 14 the extraction means 28 can be operated to facilitate the removal of a video cassette 12 from the close fitting storage compartment 24 of the jacket. Thus, when a particular video cassette 12 is desired for play, the party desiring such a cassette merely grasps with his thumb and index finger the tab 84 of the extraction means 28 fixedly secured to the jacket 14 containing that video cassette. The tab 84, as will be appreciated, is defined by the end 48 of the extraction device and is that portion of the outer portion 60 sticking out (FIG. 1) when the video cassette is located within its jacket. The party then pulls the tab 78 in a direction horizontally outwardly from the storage compartment. This causes the outer portion 60, with the bottom planar surface 86 of the video cassette 12 resting on the upper planar surface 54 of the sliding member, to be pulled outwardly toward the open front end of the jacket, as shown in FIG. 2. In doing so, the bottom planar surface 56 of the outer portion or sliding member 60 slides along on the inside planar surface 78 of the bottom member 34 of the protective jacket. The planar surface 54 of inner portion 58 presses against the back of the video cassette causing it to be moved forward out of the protective jacket's storage compartment 24 a sufficient distance and the rear edge of the cassette (FIG. 2) to clear the front edges of the protective jacket defining the open front of the jacket. Thus, the back edge of the video cassette 12 can then be readily grasped by one's fingers and fully removed from the protective jacket. When the cassette 12 is removed from the outer portion, the spring-like nature of the extraction device 28, particularly the planar member 62, causes the outer portion of the first-named planar member 28 to be retracted, on release of the pulling force, into the storage compartment to its closed, or at rest, position. Thus, the inner portion 62 will be vertically disposed and the first and second members to be in planes essentially parallel to that defined by end closure 36. The tab 84 will extend outwardly somewhat from the front edge of the protective jacket 14, as seen in FIG. 1.

When finished viewing the video cassette 12, the party viewing such will place it back, i.e., push it back, into the empty protective jacket 14. On so doing, the video tape access face of the cassette will be located directly against the top planar surface 54 of the inner portion 62. When this occurs, if not accomplished already, the second planar member 62 will be seated into the rectangular-shaped opening 76. Thus, the cassette 12 can then be later removed for viewing, as desired, the removal being facilitated by the extraction means 28 of the invention as earlier disclosed.

Over an extended period of time of use, the inner portion of the extraction device 28 may lose some of its flexibility. Nevertheless, such will not have any effect upon the ability of the extraction means 28 to facilitate the removal of a video cassette from its protective jacket. Such a loss in flexibility may, however, reduce somewhat the spring-like ability of the inner portion to return to its original location, i.e., in opening 76, and in the more preferred vertical disposition against the back wall 36. If such occurs, however, on again placing the cassette back into the protective jacket, the pushing of the video cassette into the jacket will cause the member 62 to be returned to the vertical position, and located in the opening 76.

The extraction device 28 can be constructed of various materials, e.g. plastic, metal, wood lamina, coated paper, etc. or a combination thereof. In the most preferred aspects of the invention, the extraction device should be, as earlier disclosed, characterized by some desired flexibility. Thus, the two planar members comprising the inner portion will preferably have sufficient flexibility to allow them to be bent from the vertical (FIG. 2) and into a non-planar configuration as shown in the drawings. Such members, preferably, need also be characterized by memory or elasticity, i.e., their ability to return to the original upright or vertical planar disposition, and in substantial contact or closely adjacent with one another, as earlier disclosed, and against the inner surface 38, once the force causing the members of the inner portion to be bent out of shape for withdrawing of the video cassette, is removed.

Most preferably, however, the extraction means 28 will be manufactured from a thermoplastic material, e.g., polyester, polyvinyl chloride, polypropylene, etc. The preferred material is a Mylar ® polyester film about 0.1 mm thick. Such a film may be extruded according to conventional techniques from a composition that has been formulated in usual manner to give the desired flexibility. It will be appreciated that various components can be added to the plastic composition to provide any physical characteristics desired, e.g. flexibility or stiffness, elasticity, hardness, etc. Coloring agents can be added to provide a tab 84 of the desired color. The extruded film can be cut up into suitable lengths for further processing into an extraction device 28 according to the invention. This can be achieved by various techniques known to those in the art.

The most preferred extraction means 28 will be constructed of one piece, e.g., a single predetermined length of flexible metal strip or plastic film. The more preferred material is a flexible plastic film as such will offer economics in manufacture and ease in production of the extraction means by various techniques well known to those skilled in the art. Thus, a suitably flexible polyester film having a thickness of about 0.1 mm and being about ¾" wide can be extruded and then cut into lengths of about 12", the one end being straight and the other end being rounded as shown in FIG. 3. A length of film, measured from the straight end, about 3.5" long, is then folded upon itself to form the crease 80. The fold can be then heated, if desired, to form a permanent bend or crease in the thermoplastic film as shown by reference numeral 80 in FIG. 3. During manufacture, the second planar member can be provided in the inner portion. Or, if desired, such can be die-cut into the inner portion. Thus, the extraction device 28 is formed. The inner portion, if the crease is to be heated, is then folded against the remaining length of the film, i.e., the outer portion and the fold is heated whereby to form an angle most preferably of about 90 degrees or less between the opposing faces of the two portions. It will be appreciated by those skilled in the art, however, that, instead, a suitable width of preformed film may be folded upon itself and then cut to form the planar members, the two portions of each member being folded together and the fold heated to form the crease 80.

Figure 4:
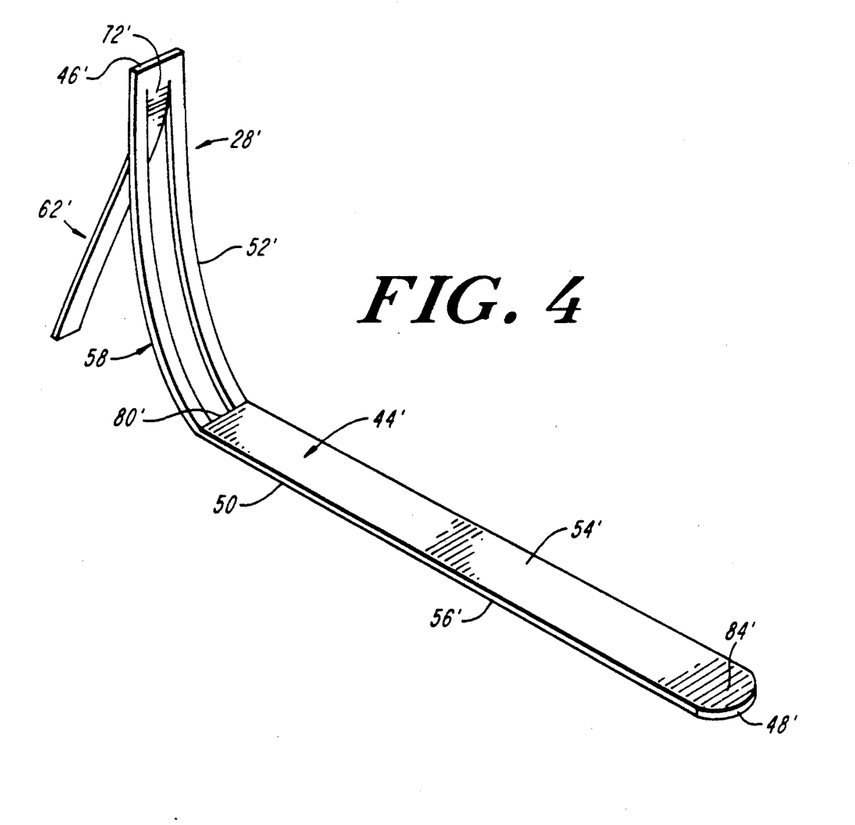
FIG. 4 is a view in perspective of another extraction device according to a further aspect of the invention.

In some cases the protective jacket for a video cassette is constructed such that the video cassette is extracted from an end of the jacket. Where such occurs, an extraction device of like construction to extraction device 28 can be manufactured, as shown in FIG. 4. The differences in the two extraction devices shown in FIGS. 3, 4 lie in the length of the outer portion 60'. Components of like construction in the two extraction devices shown will bear the same reference numeral but those in FIG. 4 will be distinguished by a prime symbol. The length of the outer portion of extraction device 28' will be considerably longer than that of extraction device 28. This is due to the fact that the inner portion of the device is secured to the closed end of the protective jacket. The outer portion must slide along and on an inner surface of one of the side walls of the jacket. The outer portion should be sufficiently long enough to provide a tab 84', for the purposes earlier disclosed for tab 84.

Instead of providing extraction devices of two different lengths, as shown in FIGS. 3 and 4, a more universal device can be manufactured that can readily be converted by the consumer, if retrofit extraction devices are purchased, to be used with either an end or side edge loading protective jacket. Thus, an extraction device of the length of that shown in FIG. 4 can be provided, such a device being provided with score lines or the like whereby portions of that extraction device not needed can be broken or cut off. For example, the length of the inner portion can be retained the same in each device. In this case, score lines can be provided at the appropriate location on the outer portion, enabling the outer portion to be shortened and an extraction device as shown in FIG. 3 produced. Or, the extraction device can be provided with two inner portions in sequence along the length of the device from its inner end. In this case, a score line for cutting can be provided intermediate the adjacent ends of the second named planar members 62. If an extraction device as in FIG. 3 is required, the user need merely cut-off that outer inner portion not desired.

The invention has been particularly described with respect to the easy extraction of video cassettes from their closely-fitted storage jackets. Nevertheless, it will be readily appreciated that the invention in its broader aspects is not so limited. The extraction means of this invention will facilitate the removal of any object from a close fitting jacket or enclosure having an open face and of such a construction that makes difficult the grasping of the object with one's fingers for removal of the object from the storage jacket. Thus, audio cassettes can be, if desired, packaged and sold in a rectangular-shaped protective jacket having an opening like that of the video cassette jackets now conventionally used, rather than in the containers or boxes, as they are presently now marketed. Such a protective jacket will offer economies not believed now realized in packaging of the audio cassettes, to be purchased by the consumer. With such a protective jacket, moreover, the consumer can store a plurality of audio cassettes in a storage device not having any dividers therein as now commonly used for defining individual storage cavities for the storing of individual audio cassettes. Thus, storage devices for audio cassettes can be provided of much simpler and more economical construction. Furthermore, a somewhat larger number of audio cassettes can be stored in a storage device without dividers but having the same overall linear dimension as that of the divided storage device. This will offer economy in storage space to the consumer.

Further, it will be readily appreciated that the invention is not limited to merely video and audio cassettes. The extraction means of the invention can be used with storage jackets for other types of cassette devices. The invention, moreover, may find application wherever a member is stored within a storage jacket and the spine or back surface of the member stored is flush with the edges of the jacket opening. Thus, among other applications, it is envisioned that the extraction means of the invention can be used with jackets for conventional corporate record books, user's guides for computer software and other educational materials such as training manuals, booklets, pamphlets, and the like.

Other modifications and changes, as will be understood by those skilled in the art, can be made in the invention and its form and construction without departing from the spirit and scope thereof. The embodiments of the invention disclosed herein are merely exemplary of the various modifications that the invention can take and the preferred practice thereof. It is not, however, desired to confine the invention to the exact construction and features shown and described herein, but it is desired to include all such as properly come within the spirit and scope of the invention disclosed.

What I claim is:

1. Device for use in aiding the extraction of a three-dimensional object from a close-fitting protective jacket therefor having an open front and defining an internal cavity for storage of said object, said extraction device comprising an elongated planar member of predetermined length defined by inner and outer ends and parallel, spaced-apart side edges and by top and bottom planar surfaces, said elongated planar member being further defined by an inner portion and an outer portion connected thereto, at least one elongated second planar member of predetermined length defined by top and bottom planar surfaces being provided in said inner portion of the extraction device and extending lengthwise thereof defined by parallel, elongated, spaced-apart, side edges parallel to the side edges of the first-named, elongated planar member and being located therebetween, said at least one second planar member being further defined by an inner and outer end edge of predetermined length spaced-apart from and parallel to one another, said inner and outer end edges being laterally disposed and perpendicular to the elongated side edges of the first-named planar member, the outer end edge and side edges of the at least one second planar member being free of the first-named planar member and the inner end edge thereof being fixedly attached thereto whereby when the bottom planar surface of the said at least one second planar member is secured adjacent its outer end to a fixed member and a force is applied to the first-named planar member at its outer end, the said at least one second-named planar member can be separated from the first-named planar member defining an opening in the inner portion of the first-named planar member of like shape and dimensions as the second-named planar member, the inner portion at least of the first-named planar member being sufficiently flexible so that when the force applied to the outer end of first-named planar member is released, the inner portion of the first named planar member will be caused to close on the second-named planar member and said second-named planar member will be relocated in the opening in said inner portion.

2. Device according to claim 1 wherein only one second-named planar member is provided in the inner portion of the first-named planar member and the inner portion of the device is defined from the outer portion by a crease extending laterally across the first-named planar member and perpendicular to its side edges, said crease dividing the inner portion from the outer portion of the first named planar member.

3. Device according to claim 1 wherein the first-named planar member is of a flexible plastic material.

4. Device according to claim 3 wherein the plastic is a flexible polyester film.

5. Device according to claim 4 wherein said film has a thickness of about 0.1 mm, is about ¾" wide, the inner portion has a length of from about 3 to 3.5 inches, and the outer portion has a length about 5.0 inches.

6. Device according to claim 5 wherein the inner end edge of the second-named planar member is located inwardly from the inner end of the first-named planar member about ⅝ of an inch.

7. Device according to claim 1 wherein two second-named planar members are provided in the inner portion in longitudinal relationship to one another, the inner end edge of the first second-named planar member being located about ⅝ inches from the inner end of the first-named planar member, and outer end of the first second-named planar member is located about ⅝ inches from the inner end of the second second-named planar member, and the outer portion of the first-named planar member is about 5 inches in length.

8. In a rectangular-shaped protective storage jacket for a video tape cassette, said jacket being defined by spaced-apart, parallel, planar side walls each of the same predetermined length and width, each side wall defining parallel top and bottom side edges intersected by parallel front and rear end edges perpendicular thereto, parallel spaced-apart, planar top and bottom members each of the same predetermined width and length and having top and bottom planar surfaces, and each defining parallel side and front and rear end edges, said top and bottom members being in planes perpendicular to those planes defined by the said planar side walls, the said side edges of the top and bottom members intersecting and being connected to respective side walls at their said top and bottom side edges, the said side edges of the planar side walls and the said side edges of the said top and bottom members being coextensive in length, a rectangular-shaped planar closure member of predetermined length and width defining parallel side edges and parallel upper top and lower end edges, the said side edges of the closure member being of the same length as the said rear end edges of the said side walls, said closure member defining a plane which lies in perpendicular disposition to the planes defined by the said side walls and said top and bottom members, said side edges of the said closure member intersecting with and being connected to respective side walls at their rear end edges, and the said end edges of the closure member intersecting with and being connected to the end edges of respective top and bottom members, whereby a rectangular-shaped internal storage cavity is defined for protective storage of the video cassette, said planar closure member being further defined by an inner planar surface and an outer planar surface, the improvement comprising in combination with said protective jacket a device providing easy extraction of a video cassette from the said storage cavity, said extraction device comprising an elongated planar member of predetermined length defined by inner and outer ends and parallel, spaced-apart side edges and by top and bottom planar surfaces, said elongated planar member being further defined by an inner portion and an outer portion connected thereto, at least one elongated second planar member of predetermined length defined by top and bottom planar surfaces being provided in said inner portion of the extraction device defined by parallel, elongated, spaced-apart, side edges parallel to the side edges of the first-named, elongated planar member and being located therebetween, said at least one second planar member being further defined by an inner and outer end edge of predetermined length spaced-apart from and parallel to one another, said inner and outer end edges being laterally disposed and perpendicular to the elongated side edges of the first-named planar member, the outer end edge and side edges of the at least one second planar member being free of the first-named planar member and the inner end edge thereof being fixedly attached thereto whereby when the bottom planar surface of the said at least one second planar member is secured adjacent its outer end to a fixed member and a force is applied to the first-named planar member at its outer end, the said at least one second-named planar member can be separated from the first-named planar member defining an opening in the first-named planar member of like shape and dimensions as the second-named planar member, the inner portion at least of the first-named planar member being sufficiently flexible so that when the force applied to the outer end of the first-named planar member is released, the first named planar member will be caused to close on the second-named planar member and said second-named planar member will tend to be relocated in the opening in said inner portion, the bottom planar surface of the said at least one second-named planar member being fixedly secured to the said inner surface of the closure member at its lower end edge, and the bottom planar surface of the outer portion of the first-named planar member being in opposition to the upper planar surface of the bottom member of the protective jacket and being capable of sliding engagement with said upper planar surface.

* * * * *